United States Patent [19]

Koombes

[11] Patent Number: 4,752,834
[45] Date of Patent: Jun. 21, 1988

[54] RECIPROCATING RECORDING METHOD AND APPARATUS FOR CONTROLLING A VIDEO RECORDER SO AS TO EDIT COMMERCIAL MESSAGES FROM A RECORDED TELEVISION SIGNAL

[75] Inventor: Michael E. Koombes, Vancouver, Canada

[73] Assignee: Shelton Video Editors Inc., Vashon, Wash.

[21] Appl. No.: 298,206

[22] Filed: Aug. 31, 1981

[51] Int. Cl.$^4$ ............................................. H04N 5/782
[52] U.S. Cl. ..................................... 358/335; 358/165; 358/908; 360/69; 360/71
[58] Field of Search ....................... 360/9–11, 360/14, 33, 35, 69, 71; 358/10, 139, 160, 165–167, 185, 188, 198, 127–132, 165, 908, 335

[56] References Cited

U.S. PATENT DOCUMENTS

| | | | |
|---|---|---|---|
| 3,011,030 | 11/1961 | Langendorf | 369/50 |
| 3,681,523 | 8/1972 | Sidline | 360/72.2 |
| 4,283,735 | 8/1981 | Jagger | 358/4 |
| 4,314,285 | 2/1982 | Bonner et al. | 360/33 |
| 4,319,286 | 3/1982 | Hanpachern | 360/33 |
| 4,325,088 | 4/1982 | Wright | 360/14 |

Primary Examiner—Robert L. Richardson
Attorney, Agent, or Firm—Larry A. Jackson

[57] ABSTRACT

In order to edit commercial messages from an off-the-air video recording of a television signal, method and apparatus are disclosed for automatically operating a video tape recorder (VTR) so that it alternates between a normal forward record mode, and a rewind or back-scan mode in response to the detection of audio and video fade conditions in the television signal which occur at the beginning and end of each commercial message. A fade detection circuit receives the television signal, while it is being recorded on the VTR, and develops a control signal in response to each detected fade transition such that a single commercial interruption in the television program will be accompanied by a first and then a second fade transition control signal marking the beginning and end of the interruption. Two consecutive commercial messages are accompanied by a first, second, and then a final or third fade control signal. Cooperating with the fade detection circuit is a reciprocating editing control which receives the first fade control signal, memorizes the corresponding location on the tape, and then upon receiving the second fade control signal, stops the record mode of the VTR, reverses the tape to the memorized location of the first detected fade transition, and then restarts the recording operation at that tape location. Succeeding fade control signals cause a repeat of the foregoing reverse-forward sequence such that the later detected fade transition in a series, will position the tape for recording the resumption of the post-commercial program content of the television signal at approximately the same tape position where the recording of the precommercial program terminated, thereby resulting in a video tape recording of the program with commercial interruptions deleted.

10 Claims, 12 Drawing Sheets

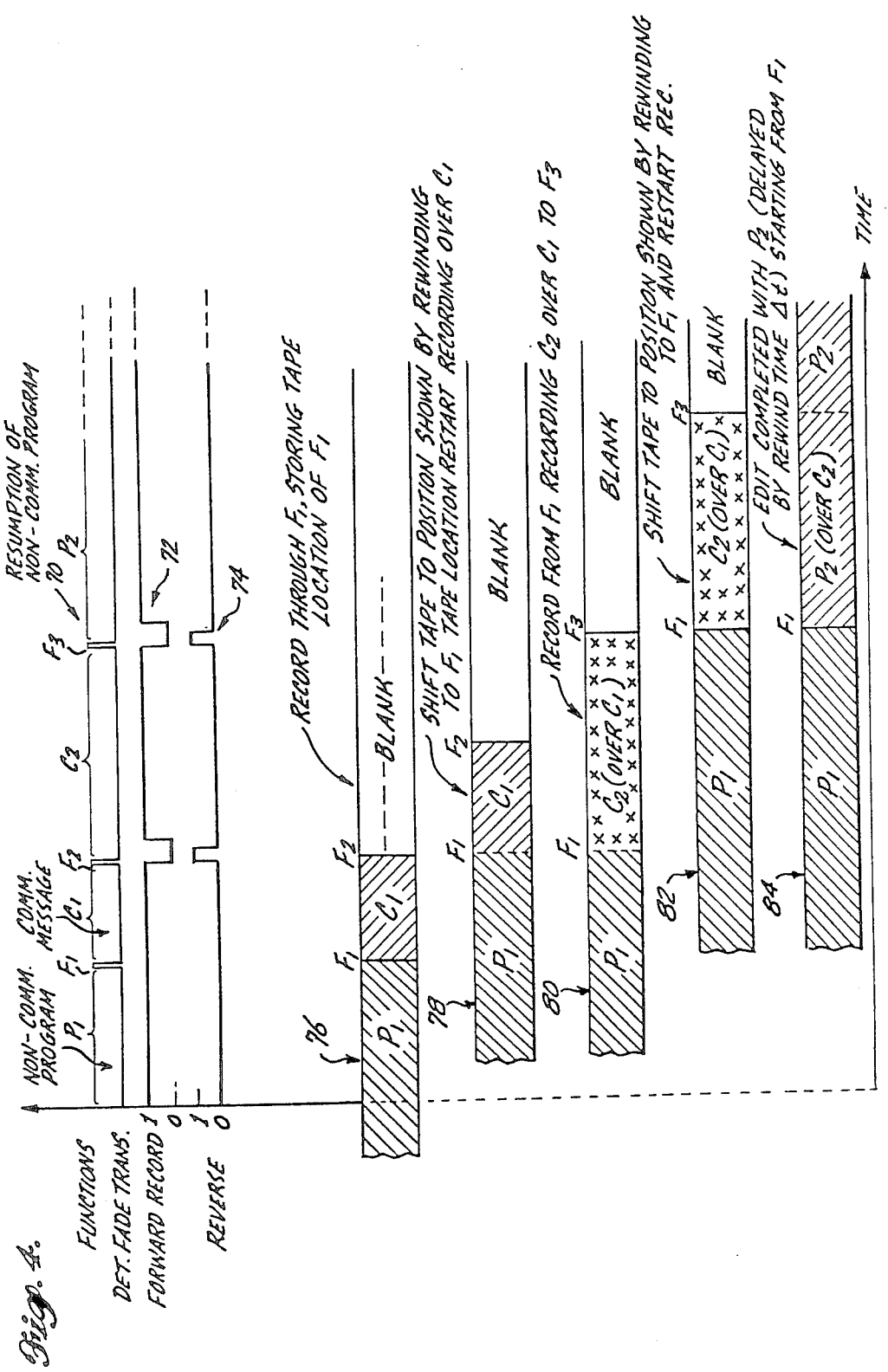

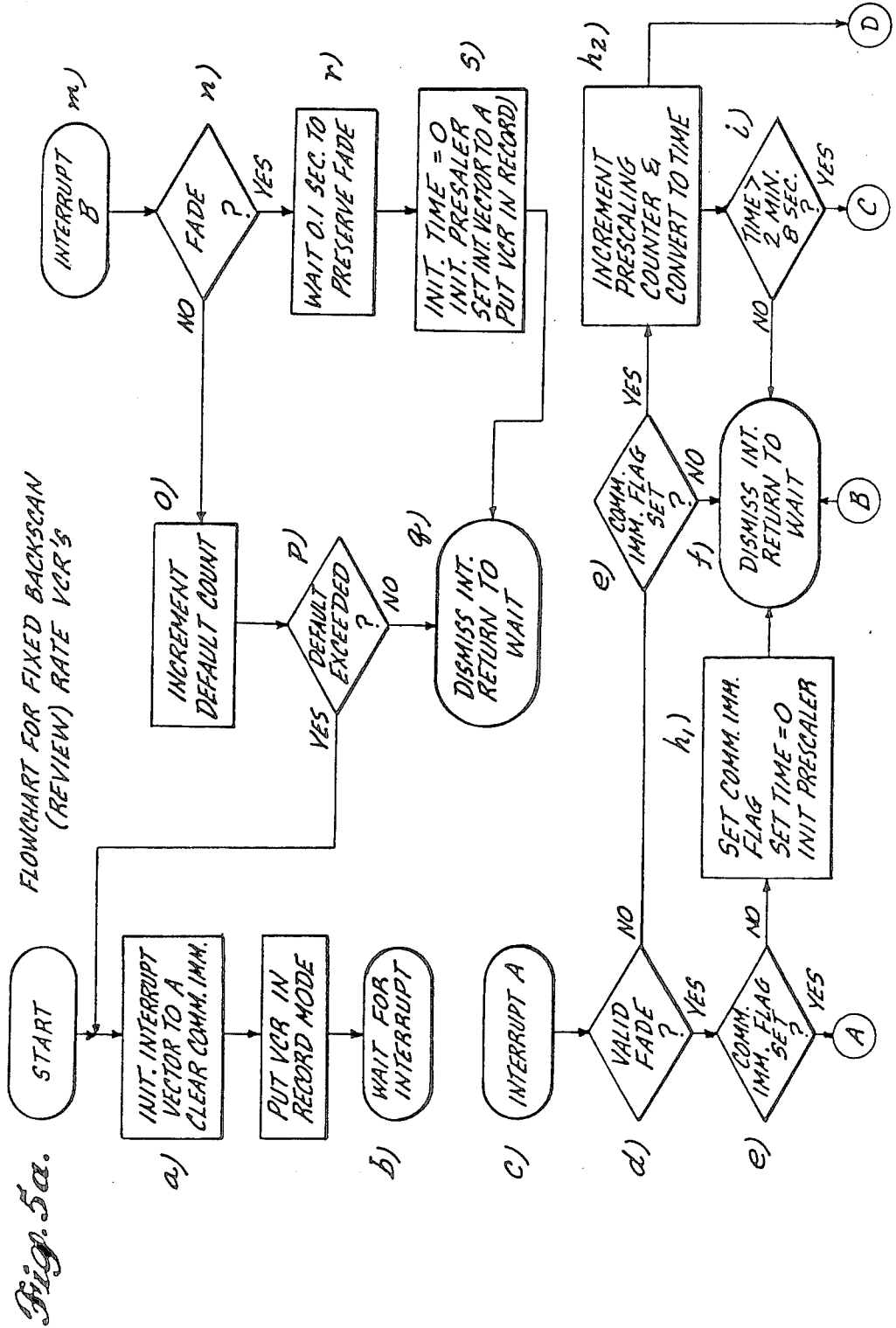

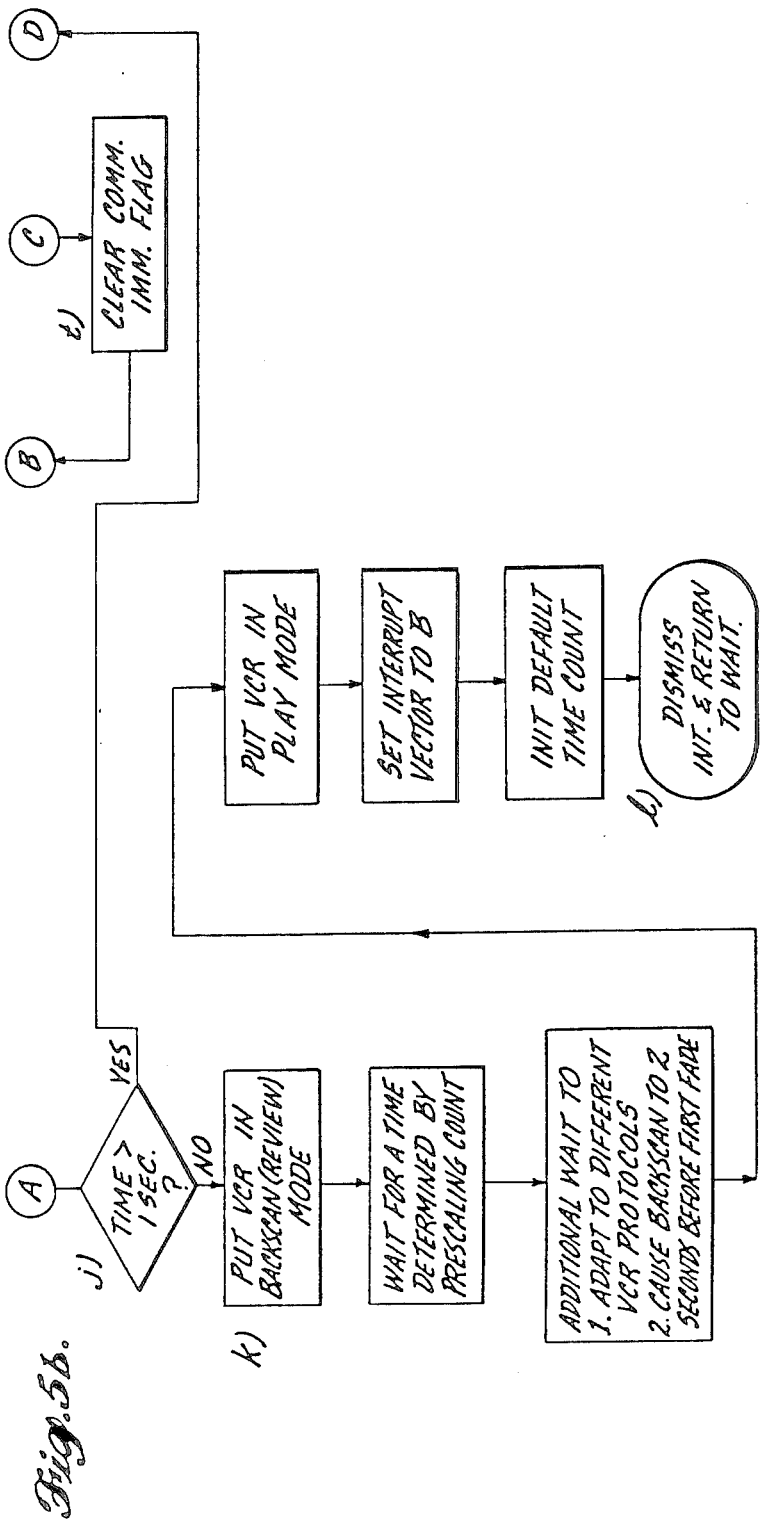

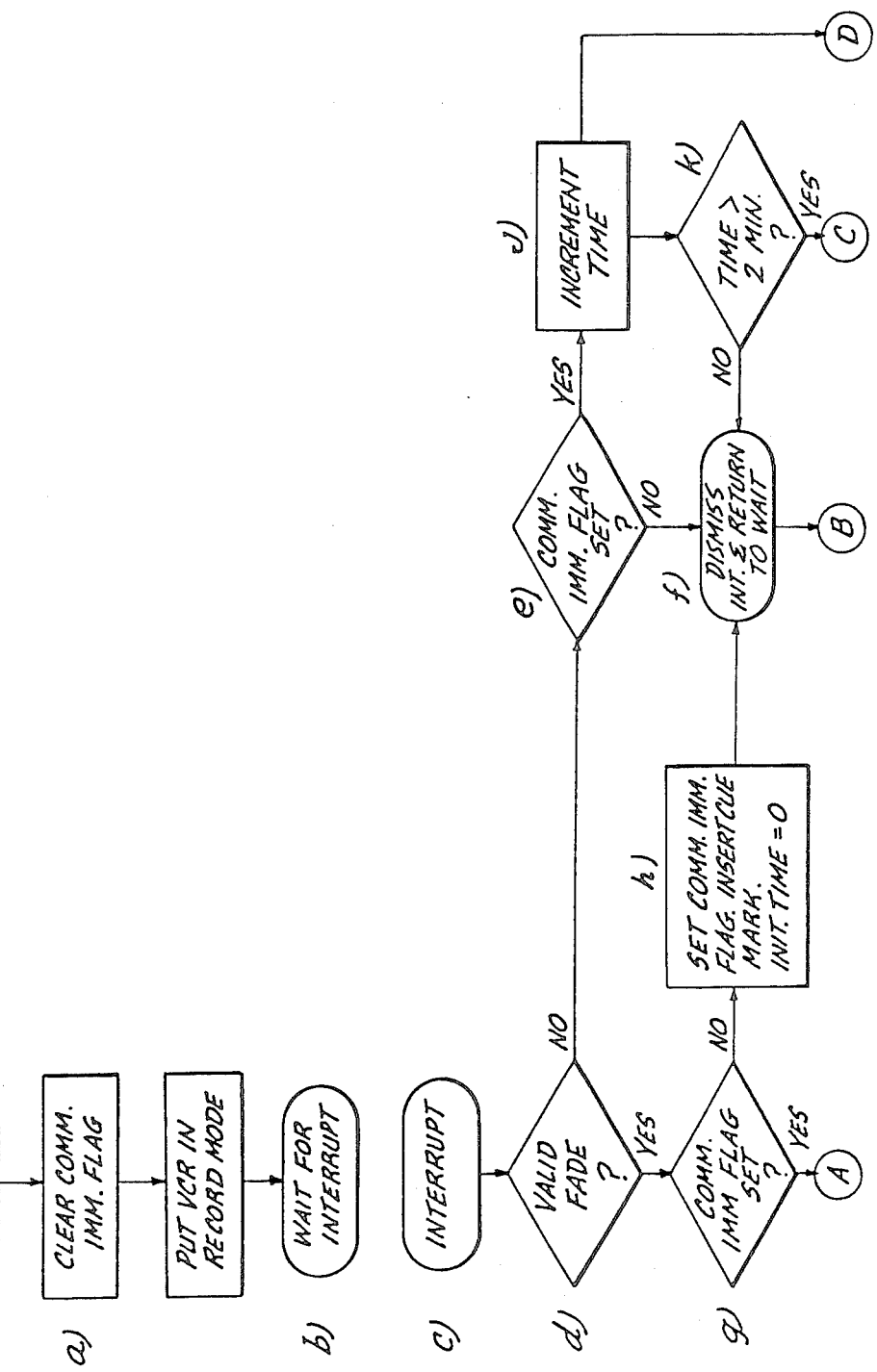
Fig. 6a. FLOWCHART FOR VCR WITH PREFERRED CUE MARK SYSTEM

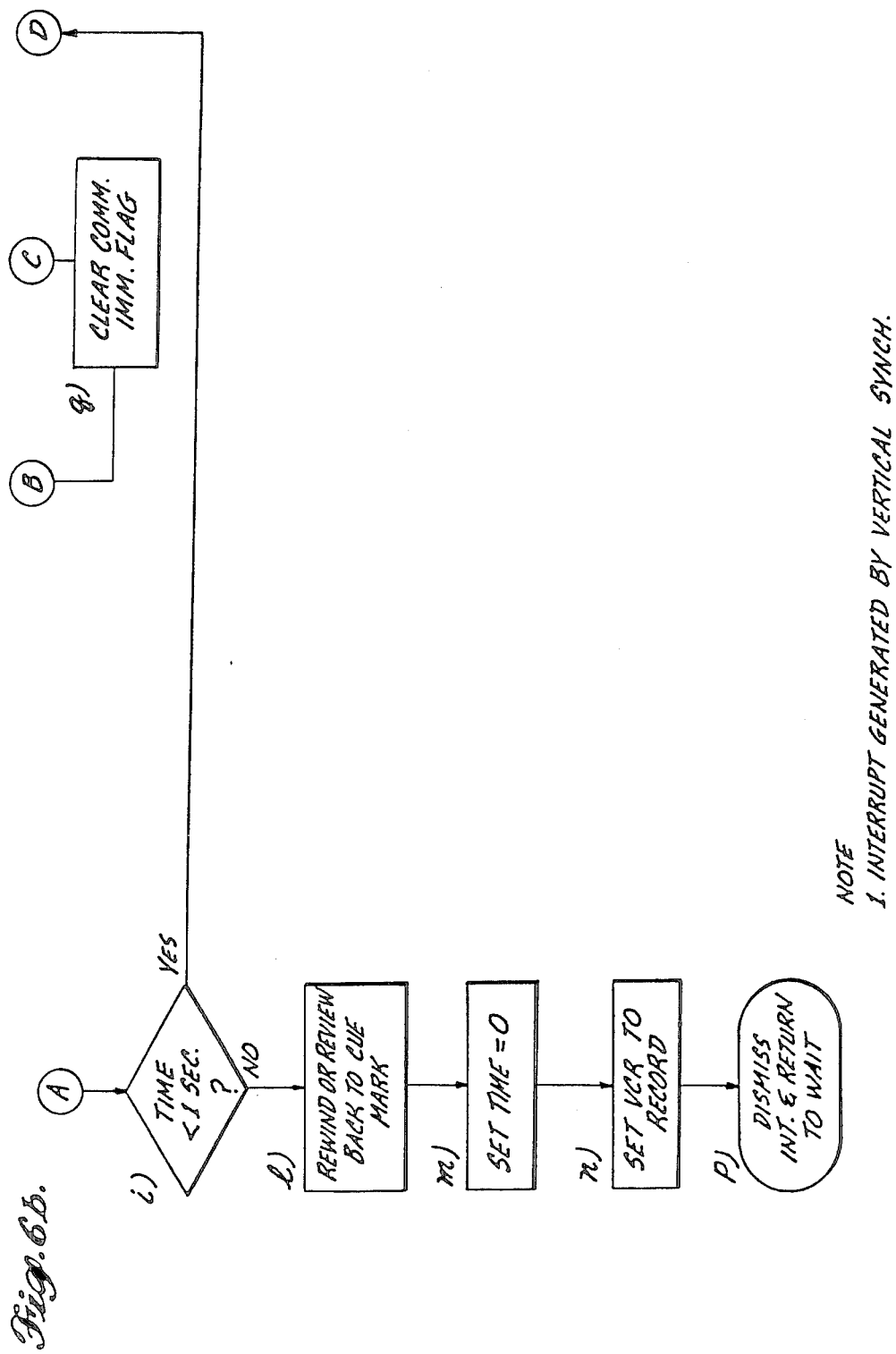

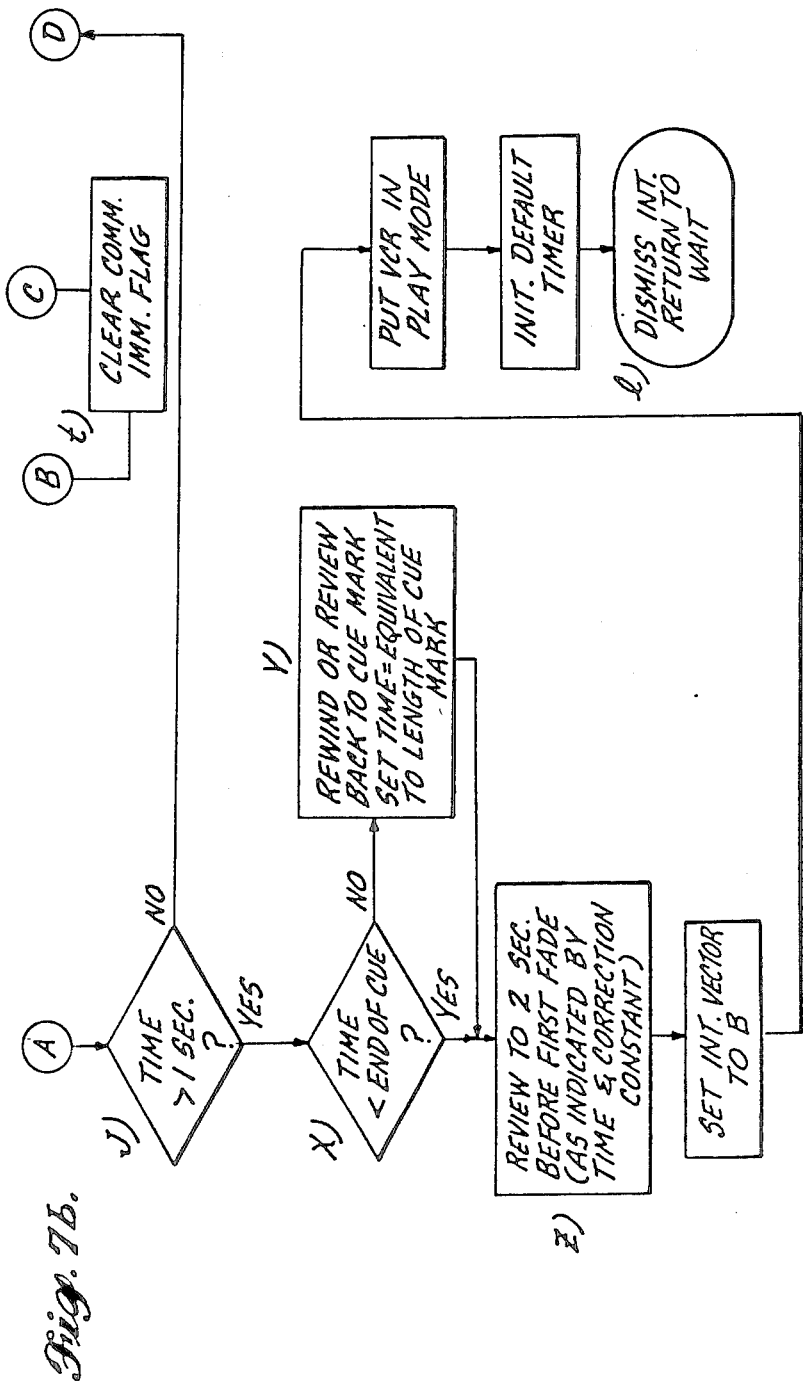

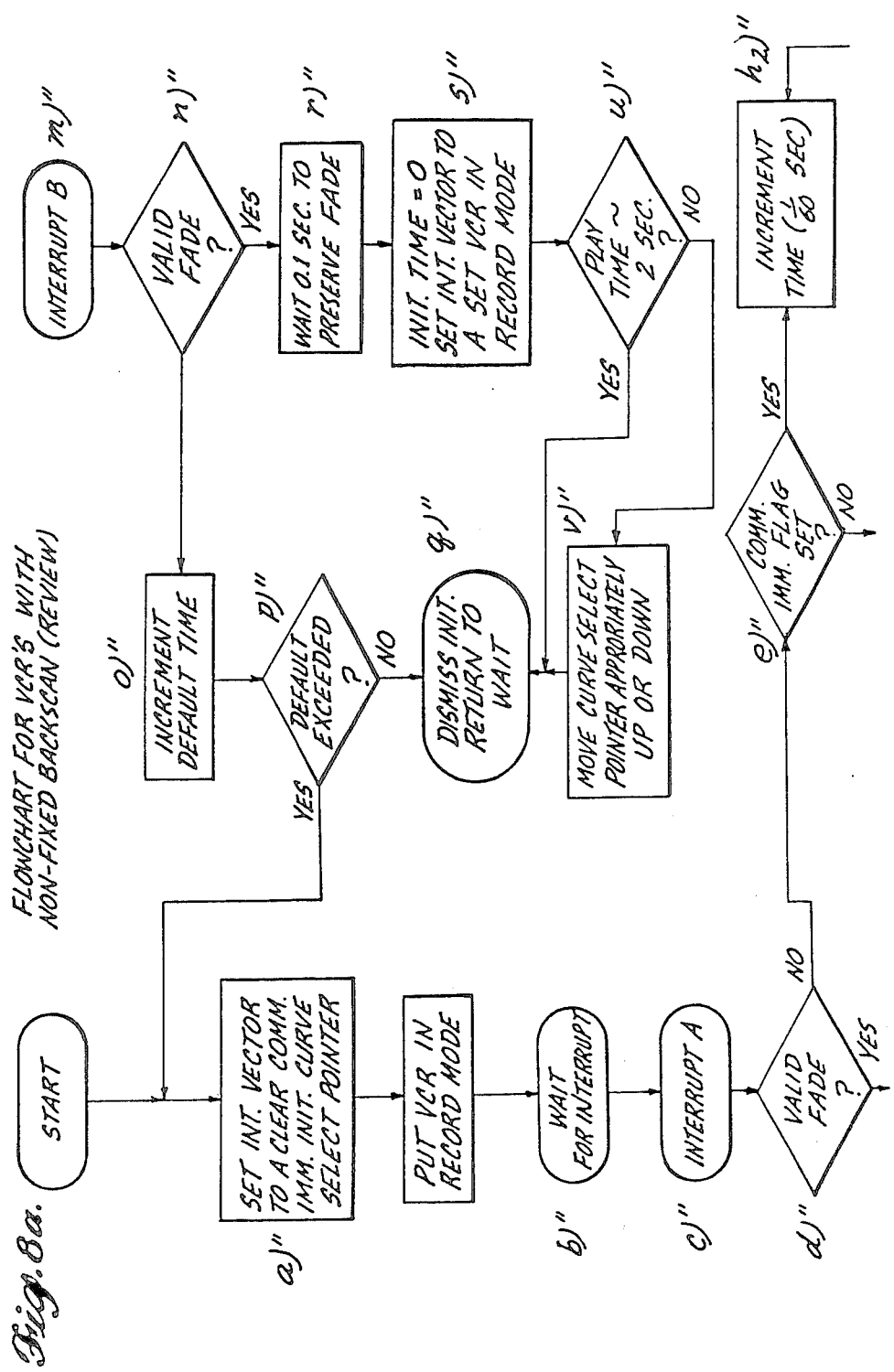
Fig. 8a. FLOWCHART FOR VCR'S WITH NON-FIXED BACKSCAN (REVIEW)

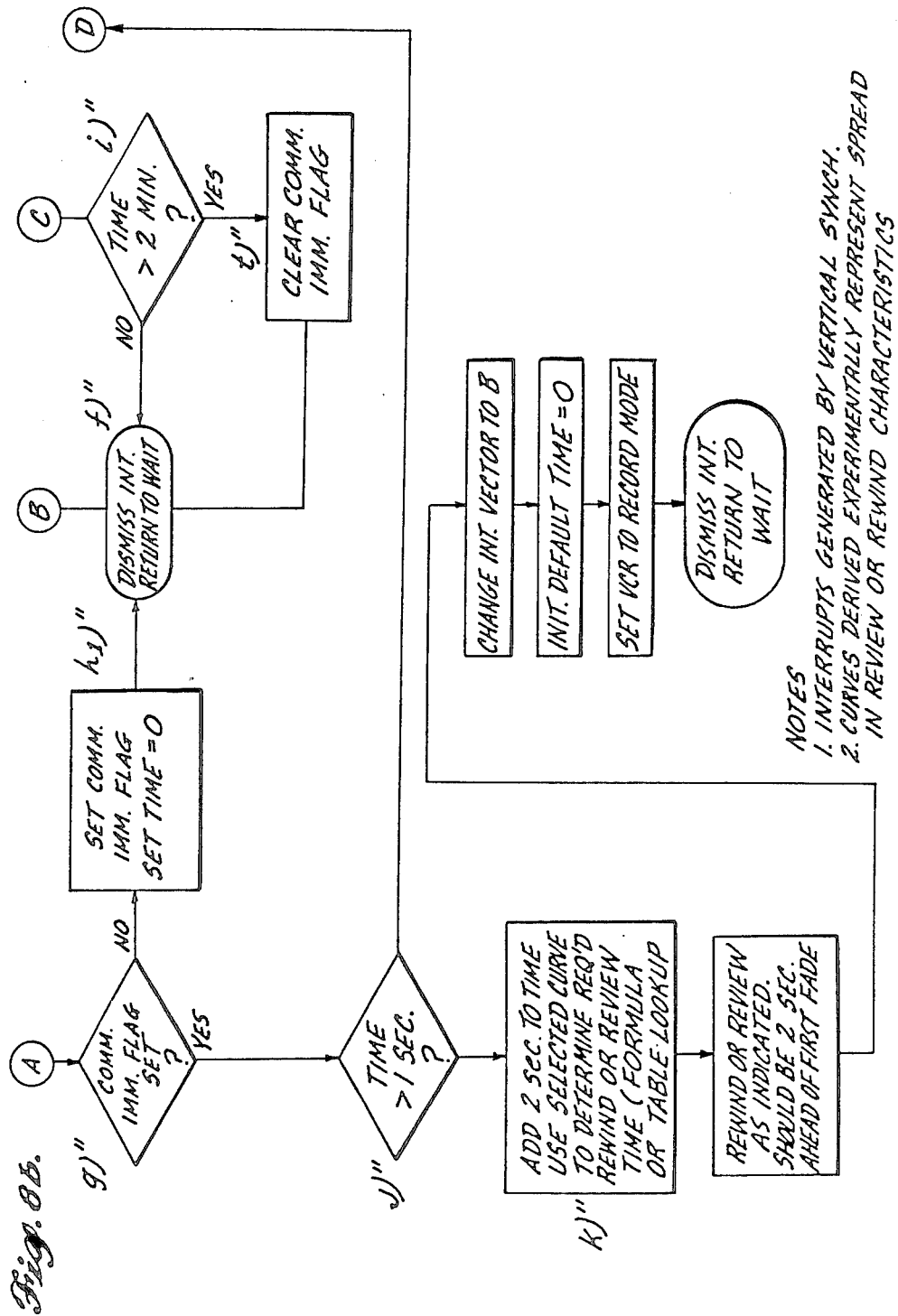

RECIPROCATING RECORDING METHOD AND APPARATUS FOR CONTROLLING A VIDEO RECORDER SO AS TO EDIT COMMERCIAL MESSAGES FROM A RECORDED TELEVISION SIGNAL

BACKGROUND OF THE INVENTION

The invention relates to video recording of television signals in which certain detectable segments of the television signal, such as commercial interruptions, are edited from the recording.

A number of systems have been developed from editing commercial messages from the reception and/or recording of television signals. For example, copending U.S. patent application, Ser. No. 77,733 now U.S. Pat. No. 4,390,904 and filed by by Howard R. Johnston and Michael E. R. V. Koombes on Sept. 20, 1979 for AUTOMATIC CIRCUIT AND METHOD FOR EDITING COMMERCIAL MESSAGES FROM TELEVISION SIGNALS, cites early efforts to automatically detect the occurrence of commercial interruptions and then delete them from off-the-air recordings. Also disclosed in application Ser. No. 77,733 is a fully automatic commercial editing system for video tape recorders (VTRs) in which the recorder is placed in a timed pause mode in response to the detection of a fade transition in the television signal that is being recorded. This fade condition is associated with a blank picture, usually a darkened screen, and absence of sound from the television speaker and is detected by monitoring certain characteristics of the video and audio components of the television signal. A timing circuit provides a resettable, timed pause interval, which interval is selected to span the duration of a typical commercial message on the commercial broadcast networks, so that a series of consecutive commercial messages will keep resetting the timing circuit to hold the VTR in the pause mode until after the series of commercials has ended and the program content has resumed.

While the system disclosed in the above-mentioned U.S. application has proved effective, it does have the disadvantage of cutting off an initial portion of the program content when the program resumes after a commercial message. The amount of lost program is a function of the duration of the resettable timing interval, which, for example, may be set at 30–32 seconds. While in many applications, such loss of program content in the completed recording is not objectionable, it would be desirable to provide an editing system that substantially reduces the amount of program content that is deleted when using an editing control system of this type.

Also, the effectiveness of the editing operation achieved by the resettable timing control, depends in part on the uniformity of the durations of the commercial interruptions. If a mixture of relatively short and long commercial interruptions is encountered in a program, the resettable timing circuit is not as effective as when the commercial interruptions are substantially all of a known, fairly uniform length. Thus, it would also be desirable to provide an editing control system of the type characterized, which functions independently of the length of the commercial interruptions and is thus capable of effectively editing from the recording, a mixture of relatively short and long commercial messages.

SUMMARY OF THE INVENTION

The above-mentioned objects are realized in a reciprocating recording method and apparatus in accordance with the present invention. Briefly, the invention provides for detecting a series of television signal transitions of a predetermined nature, such as the fade condition disclosed in the above-mentioned U.S. application Ser. No. 77,733, and automatically operating the recorder, such as a VTR, so as to cause it to assume a reverse or backscan mode from a normal forward record mode, then to resume the forward record mode. The sequence of alternating reverse and forward operations occurs automatically in response to the detection of each characteristic transition in the television signal after the first of a series of such detected transitions. In conjunction with this reciprocating (alternating forward and reverse) operation of the recorder, the recorded location of the first detected transition on the recording medium, such as on a video tape, is stored in a memory and this location information is used each time the recorder is driven in its reverse mode to bring the recording medium, such as the tape, back to the recorded location of the first detected signal transition. Thus, after the second, third, or any succeeding signal transition in the series, the recording medium is backed up to the point where the previous program content was interrupted, and continues the recording from that location. When the last transition of the series is encountered, the recording will thereafter continue in the forward direction without further interruption until another series of the signal transitions are detected.

It is observed that the only loss of program content in the completed recording will be that associated with the brief time delay required for the recorder mechanism to reverse itself, such as the rewind time of a VTR, back to the recorded location of the first detected transition of the television signal. In the case of a VTR, having a relatively high-speed rewind mode, or a back scan mode, the loss in the program content due to the tape reversal time, is many fold less than the loss of program content using a resettable timing device as referred to in the above background section.

Additionally, the reciprocating editing method and apparatus is not dependent on a uniform duration of the commercials. A thirty-second commercial interruption followed by a sixty-second commercial will be just as effectively edited as two back to back commercials of thirty or sixty seconds' duration each.

Furthermore, several other advantages are realized from the invention. First, the detection of a single, spurious transition in the television signal does not immediately cause any stoppage of the recording operation. In such event, the recorder will continue to record on through the first detected transition, and unless a succeeding transition occurs within a predetermined time interval, selected to equal the longest anticipated commercial message, the reciprocating editor control will dismiss the single, detected transition without causing any interruption in the recording operation. Thus, there is no loss in the recording, due to an erroneous detection of a transition condition. Secondly, the invention is not dependent on unfailing detection of intermediate transitions in the television signal, i.e., transitions that occur between consecutive commercials. If for example, the commercial messages are run together in a manner that does not yield an interviewing detectable fade transition, the invention will respond to the detected transition at the beginning of the first commercial message and at the end of the last commercial and will edit out all the intervening commercial messages up to the final detected transition of the series.

As disclosed herein, the reciprocating editing control apparatus and method is implemented in several different ways, with the preferred implementation depending on the particular design and operating characteristics of the recorder. Thus, in one preferred embodiment, the location of the first detected television signal transition on the recording medium, such as on the video tape, is stored in memory by counting the number of video fields that occurred after the detected transition, and then backspacing as needed to that memorized tape location by reversing the field counting operation. In another preferred embodiment, signal information from a tape movement turns-counter is monitored and the instanteous readout therefrom, at the time of the first television signal transition, is stored in memory and that stored information is subsequently used to return the video tape to the location of the first detected transition. In still another preferred embodiment, the location of the first detected signal transition is stored by causing a cue signal to be recorded on the video tape, such as on an auxiliary audio channel, and that recorded cue signal is later used to reposition the video tape during the movement to the location of the first detected transition. In still a further preferred embodiment, the memory function for locating the tape position of the first transition is accomplished by monitoring and storing the elapsed running time between the first transition and the present tape position, and then running the recorder in reverse for a measured time duration directly proportional to the stored time duration in the ratio of the forward record speed to the reverse tape speed. A feature of certain of the above preferred embodiments is to approximate the tape location of the first detected transition, then cause the recorder to overshoot that location during backspacing (reverse mode), and then precisely locate the transition by advancing the recording medium (e.g., tape) in a playback mode until reaching the previously recorded first transition at which point the recorder is commanded to its record mode.

To provide a complete disclosure of the invention, reference is made to the appended drawings and following description of certain particular and preferred embodiments.

BRIEF DESCRIPTION OF THE DRAWINGS

FIG. 4 is a timing diagram showing the relationship between various signals that occur in the apparatus of FIGS. 1 and 2, and the reciprocating movement of the recording tape as the VTR of FIG. 1 responds to the commands of the reciprocating editing control; and FIGS. 5(a) and (b), 6(a) and (b), 7(a) and (b) and 8(a) and (b) are flow diagrams of different, preferred implementations of the more generalized system diagrams shown in FIGS. 2 and 3.

DETAILED DESCRIPTION

Figure 1:
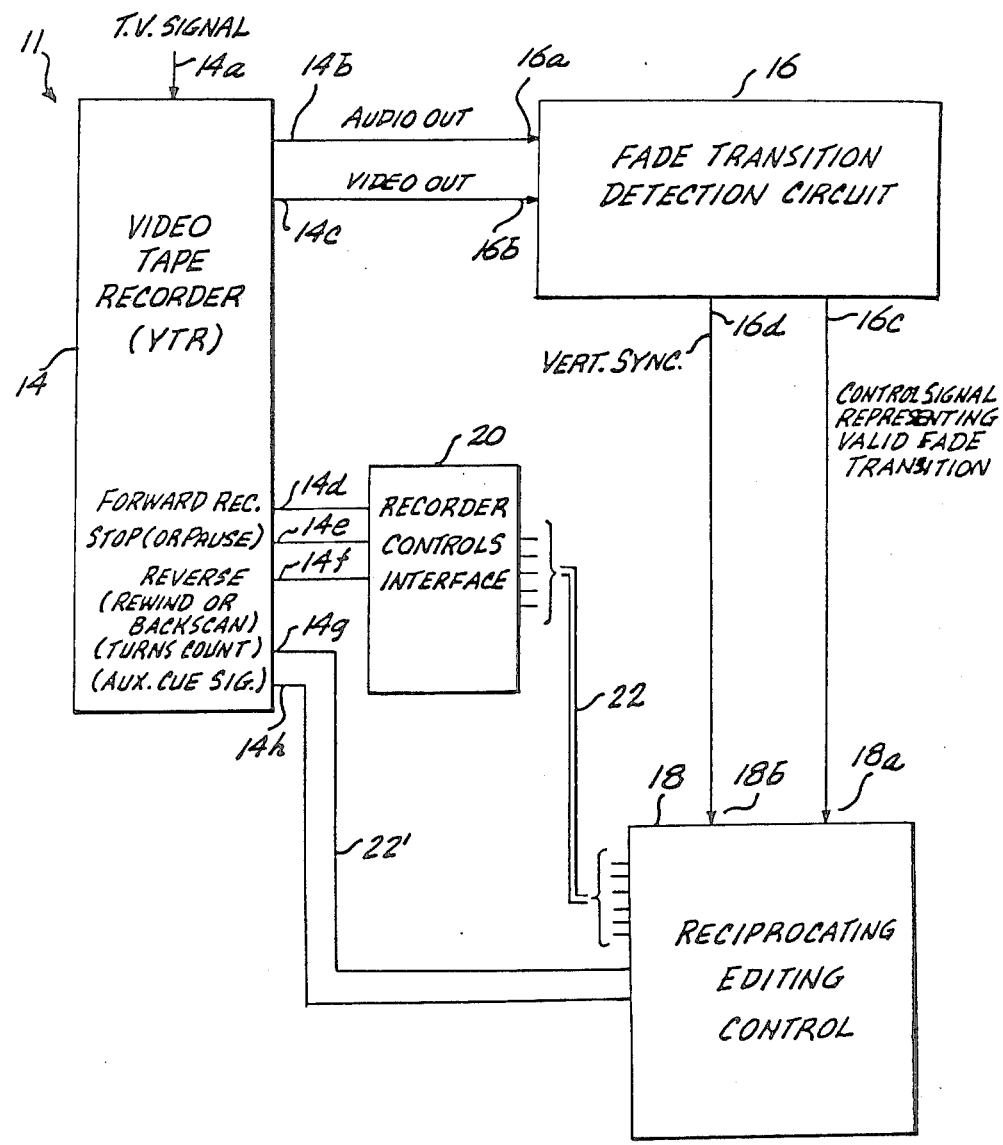
FIG. 1 is a generalized block diagram of the reciprocating recording apparatus for editing commercial messages from recorded television signals in accordance with the invention.

With reference to FIG. 1, the generalized block diagram therein shows a system 11 for editing commercial messages from a recorded television signal by a reciprocating recording method and apparatus. System 11 includes a videotape recorder (VTR) 14, a fade transition detection circuit 16, a reciprocating editing control 18, and a recorder control interface 20. Output signals from control 18 are decoded by interface 20 and converted to suitable command signals for operating VTR 14. A television signal from any of several possible sources, such as an "off the air" signal from a receiver, a closed circuit cable signal, a signal from another VTR, etc., is applied to VTR 14 via an input 14a. VTR 14 is of the type that separates the input television into audio and video signal components and provides access to such components at audio and video outputs 14b and 14c respectively. Additionally, VTR 14 is of the type that can be controlled remotely by electrical control signals applied to a plurality of inputs such as represented by a forward record mode input 14d, a stop (or pause) input 14e and a reverse (rewind and/or backscan) input 14f. Interface 20 includes circuitry similar to that which is normally incorporated in a hand-held, manually operated remote control unit for responding to manual control switches to generate command signals that select the operating modes of VTR 14. In system 11, the circuitry of interface 20, is responsive to automatically generated control signals produced by control 18 and coupled to interface 20 over a multilead cable 22 as shown. Alternatively, the coupling of control signals between interface 20 and control 18 may be transmitted by other media such as electro-optical, or sonic.

Fade transition detection circuit 16 receives the audio and video signal components at its inputs 16a and 16b, respectively, from VTR 14, and in response to these input signals generates a control probe signal at an output 16c representing each occurrence of a valid fade transition. Such a valid fade transition occurs, as described above, at the beginning and end of each typical commercial interruption in a television broadcast signal. Additionally, circuit 16 separates vertical sync from the video signal component and passes the sync pulse signal to an output 16d. These signals are applied to inputs 18a and 18b of reciprocating editing control 18 which, acting through interace 20, automatically causes VTR 14 to be alternatively operated in its forward record mode and a reverse mode, with intervening stop (or pause), mode to edit from the recorded tape, commercial messages by the detected fade transitions.

Circuit 16 may be of the type disclosed in the above-mentioned copending U.S. application Ser. No. 77,733, the description of which is incorporated herein by reference. In such case, the detected fade transition is characterized by the line signal information of the video component being below a predetermined threshold level for one to two video fields so that in effect the picture is momentarily dark (or blank), and concurrently therewith the audio component being below a predetermined threshold signal level corresponding to the absence of any audio information. When circuit 16 detects a coincidence of such conditions in the video and audio components of the television signal, a control pulse signal is produced at output 16c representing a valid fade transition. The vertical sync produced at output 16d is that derived by separating vertical sync from the video component received from VTR 14.

VTR 14, consistent with most commercially available brands, includes internal switching for causing the separated audio and video components at outputs 14b and 14c to be derived alternatively from the input television signal applied to input 14a when VTR 14 is in the record mode, and to cause the signals at outputs 14b and 14c to be derived from the videotaped television signal during the play back and backscan operating modes of VTR 14. This switching of signals at outputs 14b and 14c is significant in one of the embodiments of circuit 14 described in detail hereinafter.

While the particular operating format of VTR 14 may vary from brand to brand, the important operating modes for use in conjunction with system 11 include a forward record mode during which the tape is advanced in one direction for recording the television signal as it is received at input 14a, a mode for terminating and/or interrupting the record mode such as provided by stop and pause modes, and a reverse mode such as provided by rewind and backscan modes in which the tape can be driven backwards after the forward record mode has been stopped or interrupted. The basic mode control signals developed by control 18 are decoded by interface 20 signals compatible with the particular brand of VTR 14. Additionally, certain brands of VTR 14 provide output signals representing either turns counter as indicated at output 14g, or a cue signal read from an auxiliary cue track, used for editing purposes, and available at an output 14h. Still other VTR's have an internal cue reading system which causes the recorder to automatically halt when, during reverse search, the previously recorded cue mark is reached. It will be appreciated that not all VTR 14 suitable for system 11 include or even require outputs 14g and 14h, however, as disclosed in greater detail herein, certain embodiments of circuit 11 do utilize one or the other of these signals to locate the desired tape position during a tape reversal mode commanded by reciprocating editing control 18. In such case, one or the other of outputs 14g and 14h is coupled to control 18 over the leads of a cable 22.

Figure 2:
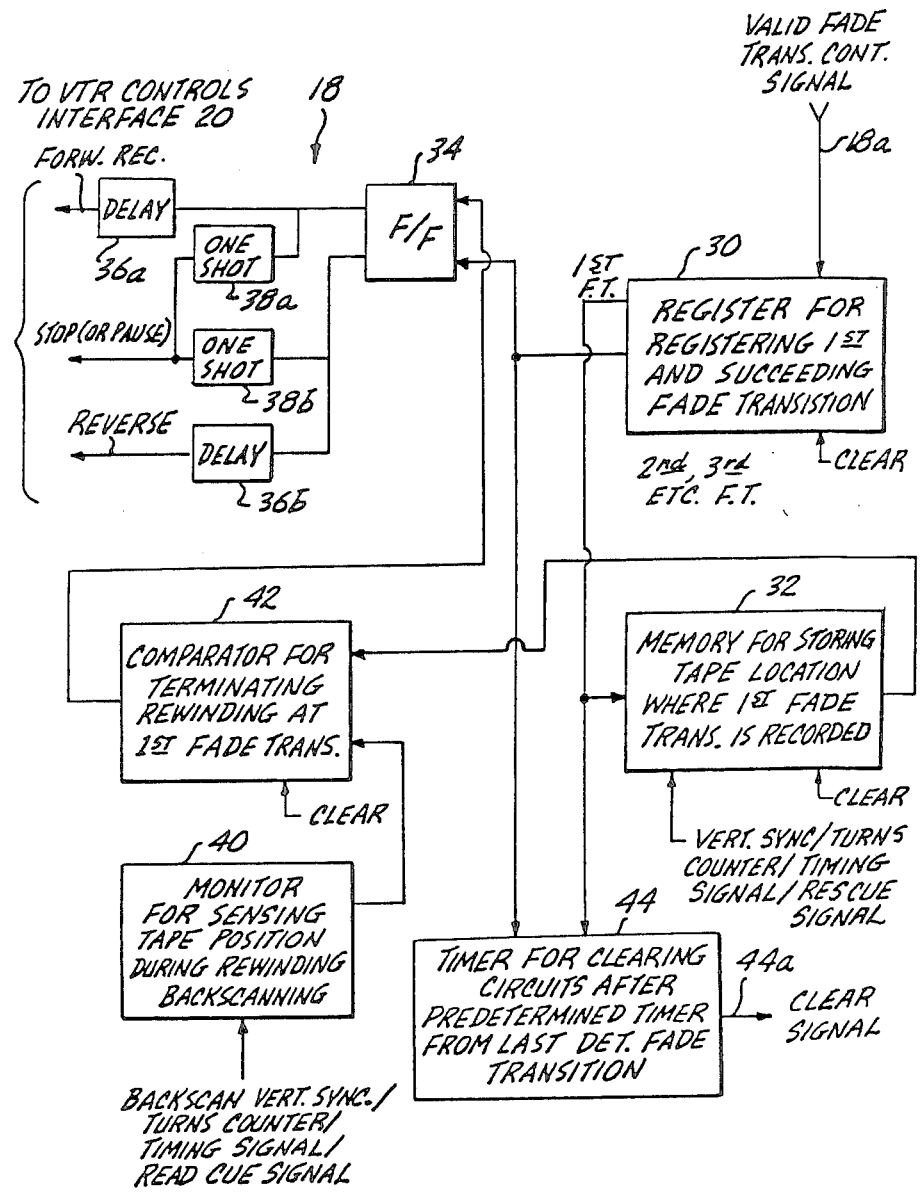
FIG. 2 is a generalized block diagram of the reciprocating editing control portion of the apparatus shown in FIG. 1.

With reference to FIG. 2, reciprocating editing control 18 is shown to include, in a simplified block diagram, the subcomponents of an electronic register 30 for registering each of a series of pulses representing fade transition control signals produced by circuit 16 and received at input 18a; an electronic memory 32 such as a counter for storing the tape location where the first of a series of fade transitions is recorded; a flip-flop device 34 and associated output delays 36a and 36b, and one shot devices 38a and 38b, all cooperating to alternately switch VTR 14 via interface 20 between a forward record mode and a reverse mode, with intervening stop (or pause) modes; a monitor 40 for sensing tape position during tape reversal; a comparator 42 cooperating with monitor 40 and device 34 for terminating the reverse operation to stop the tape at the location of the first fade transition; and a timer 44 for clearing the various circuits after a predetermined time from the last detected fade transition.

Register 30 includes a first output lead connected to memory 32 and timer 44 for applying a signal thereto that represents the first detected fade transition and causing memory 32 in conjunction with one or more of several other information signals to store the location of the tape at the time of the first detected fade transition. In the various embodiments of the invention described in detail below, the additional signal information for use by memory 32 may include a vertical sync signal, functioning as a timing signal, received from output 16d of detection circuit 16 (FIG. 1), or a turns-counter signal representing linear movement of the tape in VTR 14 and available from output 14g thereof (FIG. 1), or a timing signal from an external clock circuit, or by means of recording a cue signal onto an auxiliary audio cue track provided by VTR 14 in which case the cue signal is recorded at the instant the first fade transition is detected.

A second output of register 30 is connected to one input of flip-flop device 34 and to timer 44, and serves to feed control signals to these components in response to the detection of each succeeding fade transition, namely a second, third, etc., following the first such detected transition. With flip-flop device 34 normally in a state that commands VTR 14 to its forward record mode, the second occurring fade transition causes an output from register 30 to switch the state of flip-flop 34 which, in turn, operates stop (or pause) through one shot device 38d and thereafter switches the recorder to its reverse mode after a delay provided by delay 36b. The VTR in the reverse mode remains as long as the state of flip-flop device 34 is not changed.

While in the reverse mode, monitor 40 monitors one or more of the above-mentioned information signals, corresponding to those signals applied to memory 32, and senses the present position of the tape in VTR 14 relative to the tape location of the recorded first fade transition, as stored by memory 32. Thus, monitor 40, depending on the embodiment, may receive backscan vertical sync signals produced by the video output 14c of VTR 14 during a backscan operation and presented to control 18 via output 16d of circuit 16; or a turns-counter signal from output 14g of VTR 14; or a fixed timing signal developed by an external clock source as described above in conjunction with memory 32, with the timing signal being generated at a rate proportional to the ratio of the reverse tape speed to the forward record speed; or a cue signal read from the auxiliary cue audio track of VTR 14 and available at the output 14h of the recorder.

Comparator 42 has inputs to both the monitor 40 and memory 32 and compares the monitored signal information via monitor 40 with the memorized tape location represented by corresponding input signal information. When a match is detected by comparator 42 indicating that the tape has reached the desired tape location stored in memory 32, a signal is produced by comparator 42 that is connected over an output lead to the other input of the flip-flop device 34 for resetting flip-flop device 34 to its normal state. The flip-flop transition produces control signals that are applied to VTR 14 via interface 20 which cause the recorder to cycle through a stop (or pause) mode and then resume the forward record mode at the tape location of the first detected fade transition.

Timer 44 having inputs from both the first and second outputs of register 30, serves to clear the various circuits following the last detected fade transition of a series of same associated with one or more consecutive commercials, enabling control 18 to respond anew to a subsequent series of fade transitions marking a subsequent group of commercial interruptions. For this purpose, timer 44 includes an output 44a which produces a signal at the end of the predetermined time interval for being applied to register 30, memory 32 and comparator 42 as indicated for clearing these circuits and enabling them to respond to a new set of control signals associated with another series of valid fade transitions.

Also, timer 44 functions to discriminate against the occurrence of a single, isolated fade transition by clearing the circuitry after the predetermined timer interval so that spurious, nonvalid fade transitions do not cause an interruption of the forward record mode of VTR 14. The predetermined time interval established by timer 44 is selected to be just greater than the longest commercial message that is anticipated. For example, if the longest anticipated message is two minutes, the interval may be set at 2 minutes 8 seconds.

Figure 3:
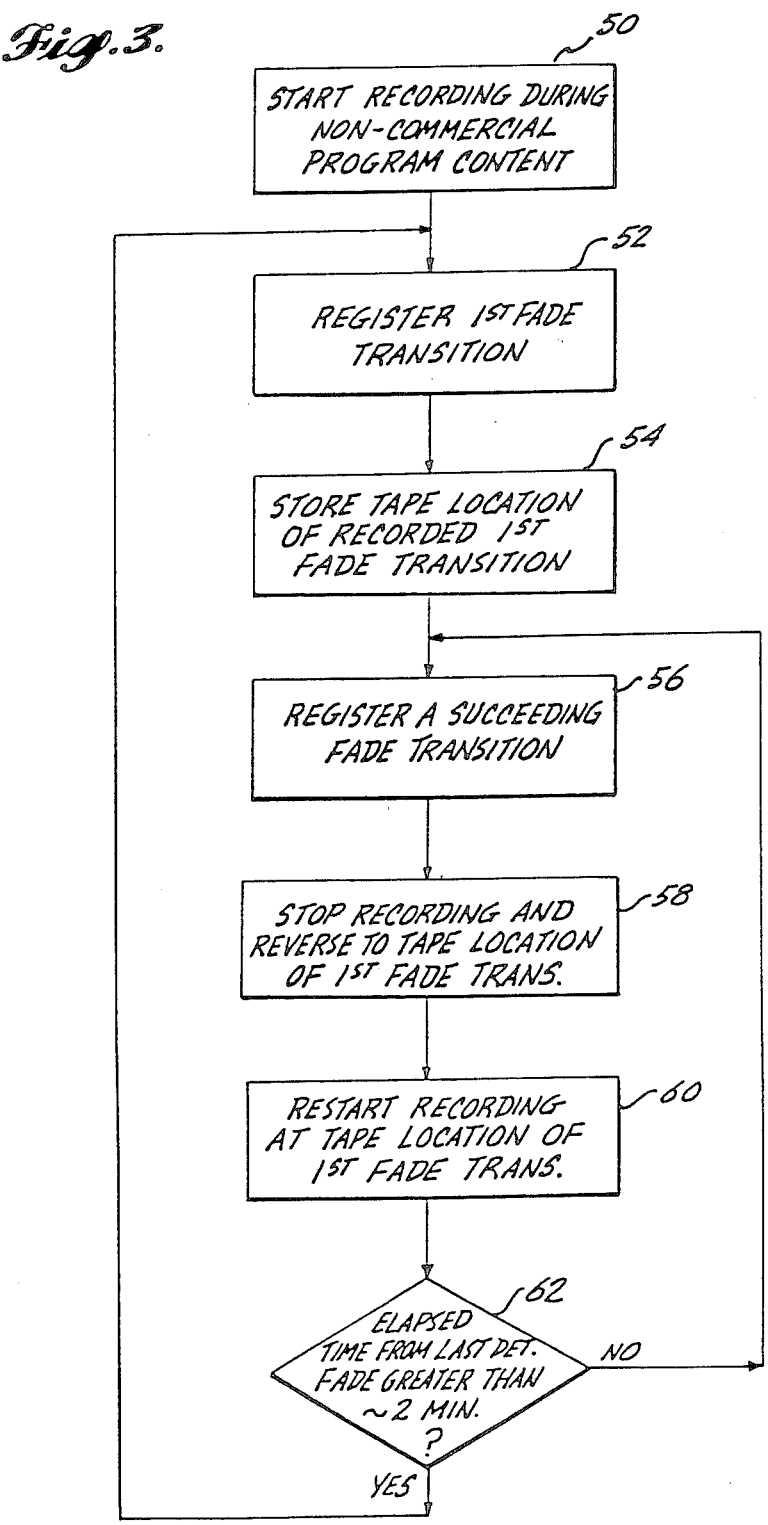
FIG. 3 is a generalized flow chart of the operating processes of the reciprocating editing control referred to above in FIGS. 1 and 2.

With reference to FIG. 3, a generalized flow diagram shows the essential operating functions of the reciprocating editing control 18 of FIGS. 1 and 2. The functions depicted in the diagram of FIG. 3 have been simplified, like the circuitry of control 18 of FIG. 2, and the implementation of these generalized functions can vary significantly in detail and complexity, depending upon the particular characteristics of VTR 14 used in system 11. For example, as disclosed in greater detail hereinafter, certain preferred forms of circuit 11 employ a general purpose, programmed microprocessor-based computer for control 18. In such case, the programming of the microprocessor generally follows the simplified flow diagram shown in FIG. 3.

This diagram commences with an instruction block 50 in which the record mode of the system is started during noncommercial program content of the television signal so that the first detected fade transition will be associated with the beginning of a commercial interruption and not at the end of a commercial. Once the system is started, a succeeding instruction block 52 registers the first fade transition, represented by the first of a series of control signals developed by detection circuit 16. At the same time that the first fade transition is registered by block 52, a succeeding instruction block 54 causes the tape location of the recorded first fade transition to be stored (memorized). At this point in time, the recorder remains in the forward record mode and continues to record the succeeding segment of the television signal which will contain the commercial interruption. Thereafter, while the VTR remains in the forward record mode, an instruction block 56 causes a succeeding fade transition to be registered. At this time, instruction block 58 commands the recorder to stop recording and to reverse, such as by means of rewind-/backscan or the like, to the tape location of the first detected fade transition. Then, an instruction block 60 calls for the restart of the recording operation at the tape location of the first detected fade transition so that the succeeding content of the television signal after the second fade transition is recorded from the tape location of the first fade transition.

Following instruction block 60, a decision block 62 monitors the elapsed time from the last detected fade transition. If the elapsed time is greater than a predetermined interval, such interval being selected to be slightly greater than the longest anticipated commercial (or series of commercials) interruption, for example, an interval slightly greater that 2 minutes is suitable, then an affirmative decision from block 62 returns the flow of the system operation to a point upstream of instruction block 52, terminating the current editing control mode and enabling the system to respond to the first detected fade transition of a new, subsequent series of such transitions. As long as the elapsed time does not exceed this predetermined interval, a negative decision will be produced by block 62 which loops the system operation back to a junction between instruction blocks 54 and 56, causing the system to continue to look for a succeeding fade transition. If a succeeding fade transition is detected within the predetermined time interval established by block 62, then that succeeding fade transition is registered in accordance with instruction block 56 and the operations associated with instruction blocks 58 and 60 are repeated. The system will remain in the loop associated blocks 56, 58, 60, and 62 until the last fade transition is detected which will be evidenced by a "yes" decision from block 62, returning the system flow to a point upstream of instruction block 52.

The affirmative decision from instruction block 62 can occur in either of two instances. First, the timing interval associated with decision block 62 can time out after the last of a series of fade transitions has been registered. For example, a single commercial interruption will be accompanied by a first fade transition and then a second (last) fade transition. After the lapse of the predetermined interval following the second (last) fade transition, a "yes" decision from block 62 will result. If two consecutive commercials are encountered, the third fade transition will be the last, representing the end of the second consecutive commercial and from which time the timing interval of decision block 62 is measured. Corresponding operation occurs in response to a series of three commercial interruptions which will be marked by first, second, third, and forth fade transitions, and likewise, for any larger number of consecutive commercial interruptions.

With reference to FIG. 4, a timing diagram shows the timing relationship between certain of the control signals occurring in detection circuit 16 and editing control 18, and the associated recording edits on the video tape. Thus, in FIG. 1, the uppermost series of pulses 70 marks the occurrence of three successive fade transitions F1, F2, and F3 and these are produced by detection circuit 16 in response to a grouping of two consecutive commercial messages C1 and C2 that interrupt the noncommercial program content P1, preceding the commercial messages, and the program content P2 that follows the commercial messages. In response to the series of three control signal pulses 70, reciprocating editing control 18 generates forward record and reverse (or backspace) function signals indicated at 72 and 74. The forward record control signal 72 is normally on (1) and switches momentarily to an "off" condition (0) in response to each of the pulses associated with fade transitions F2 and F3 following the first such fade transition F1. Conversely, reverse control signal 74 is normally off (0) and switches on (1) in synchronism with the change in the record control signal 72.

The resulting edits on the videotape are shown below the timing signals in FIG. 4, in which a strip of tape indicated at 76 shows the recording of the precommercial program P1, the first fade transition F1 and the first commercial message C1 which terminates at fade transition F2. Upon reaching the second fade transition F2, the tape is shifted backwards as indicated at 78 so that the first recorded fade transition F1 on the tape between P1 and C1 is located approximately at the second transition F2. Then as indicated by the tape strip at 80, the commercial message C2 of the television signal is recorded over C1 (C1 being erased automatically) until reaching the third and final fade transition F3. At this point, the tape is again shifted backwards as indicated by the tape strip at 82 to locate the recorded first fade transition F1 on the tape in position for resuming forward recording shortly after the detection of the third fade transition F3. With the video tape now in the position indicated at 82 in FIG. 4, the recording of the post-commercial program P2 resumes with a short time delay associated with the rewinding of the tape to previously recorded F1. Thus, as shown at 84, the noncommercial program P2, delayed by the rewind time $\Delta T$, commences from the tape location of the first recorded fade transition F1, and hence, at the termination of the precommercial program P1. Then, the resumption of the recording of program P2 writes over the brief segment of the previously recorded commercial C2 as indicated.

The principals of control 18 described by the generalized flowchart of FIG. 3 and the related operation diagrammed in FIG. 4, can be implemented in a number of different ways depending on the functional characteristics of the utilized VTR (or Video Cassette Recorder—VCR). The construction and operation of control 18 for four different kinds of commercially available VCRs are illustrated by the flow diagrams of FIGS. 5a and b, 6a and b, 7a and b and 8a and b, which respectively relate to the types of VCR having a fixed backscan rate (FIGS. 5a and 5b); a VCR having a preferred cue marking system (FIGS. 6a and 6b); a VCR having an offset cue marking system (FIGS. 7a and 7b); and a VCR having a nonfixed backscan rate (FIGS. 8a and 8b).

Fixed Rate Backscan VTR or VCR

The flowchart of FIGS. 5a and 5b describes the operation of a microcomputer used in control 18 for a fixed rate backscan VCR, such as Panasonic model 1750 made by Matsushita Electric Corporation of America, Secaucus, N.J. In general the operation is similar to that in the flow chart of FIG. 3, except that to improve positioning accuracy, the tape is deliberately "BACK-SCANNED" to overshoot the first recorded face transition by approximately 1 to 2 seconds. Then the VCR is set to the forward "PLAY" mode. This mode is continued until the fade detector of circuit 16 (FIG. 1) finds the first occurring fade transition off the tape and after a short delay (to avoid destroying the recorded fade transition on the tape) of approximately 0.2 seconds, the VCR is set to the "RECORD" mode. Thus, the originally recorded fade transition remains permanently on the tape and is followed by the resumed program material.

More specifically, the microcomputer of control 18 is interrupted by the leading edge of each vertical synch pulse received from the VCR via circuit 16 on lead 16d. A valid video fade signal from lead 16c is true only during the vertical synch interval. Thus the microcomputer of control 18 checks the signal on lead 16c in response to each vertical synch pulse.

Three different functions of the VCR are used: PLAY, RECORD, and BACKSCAN (also called REVIEW). The control 18 alternately produces digitally encoded signals representing these functions or modes and interface 20 decodes the signals in a manner known per se to cause the VCR to assume the selected mode.

The program for control 18 as shown in FIGS. 5a and 5b uses an interrupt vector to point to one of two subprograms depending on whether the VCR is in the RECORD or PLAY mode and these vectors are called Interrupt A and Interrupt B, respectively.

With reference to FIG. 5a, after START the interrupt vector points to A. A flag called Commercial Imminent (Comm. Imm.) is cleared at (a). Comm. Imm. will remain cleared until the onset of the first fade transition and will remain set until a predetermined time after the last fade transition that occurs at the resumption of regular noncommercial programming. The present preferred time before clearing Comm. Imm. flag is 128 seconds (2 minutes and 8 seconds).

Using the operational diagrams in FIG. 4 as a typical sequence, the program of FIGS. 5a and 5b operates as follows. During P1 the program will wait at (b) until interrupt, occurring at each vertical sync, sends the programmed sequence to (c), (d), (e), (f) and back to (b).

At F1 (FIG. 4) the program (FIGS. 5a and 5b) sequences from (b) to (c), (d), (g), (h₁), (f) and back to (b).

During C1 (FIG. 4) the sequence (FIGS. 5a and 5b) is from (b) to (c), (d), (e), (h₁), (i), (f) and back to (b). If F1 last longer than two fields (33 msec) and is shorter than 1 second, each valid fade transition is treated as if it were part of C1 by the sequence (b), (c), (d), (g), (j), (h₂), (i), (f), (b). This is to prevent an isolated error (spurious) fade from causing the removal of wanted material.

At F2 (FIG. 4) the sequence (FIGS. 5a and 5b) is (b), (c), (d), (g), (j), (k), to (l). During this sequence the VCR is BACKSCANNED (REVIEWED) back to approximately 2 seconds earlier than the recorded F1 fade. The VCR is then disposed in the forward PLAY mode and the interrupt vector now points to B.

In some VCRs of this fixed rate backscan type, such as Panasonic mode 1750, the BACKSCAN (or REVIEW) mode is a submode of the PLAY function so that in the above sequence, after the backspan has been completed, the VCR is left in the PLAY mode and thereby caused to go forward in PLAY and look for the nearest fade transition F1.

Specifically, the program flow passes through (b), (m), (n), (o), (p), (q), and back to (b). When the tape has played up to F1, the sequence will be (b), (m), (n), (r), (s), (q) and back to (b). The VCR is now in RECORD. The portion of C2 (FIG. 4) following F2 is recorded over C1 beginning immediately after F1. F1 remains permanently on the tape and is used as the index point regardless of the number of commercials in the series. Thus, a similar sequence happens at F3, which causes that portion of P2 following F3 to be recorded immediately following the earlier recorded F1.

The program (FIGS. 5a and 5b) will now sequence through (b), (c), (d), (e), (h₂), (i), (f) and back to (b), until "TIME" is greater than 2 min. 8 sec. Then a single sequence of (b), (c), (d), (e), (h₂), (i), (t), and back to (b) leaves the VCR recording with the Comm. Imm. flag cleared. The status will now be back to the original sequence (b), (c), (d), (e), (f) and finishing at (b).

Note that during the time that the interrupt vector is pointing to B, a sequence (b), (m), (n), (o), (p), (a), (b) is possible. This will occur if the fade detector fails to recognize the recorded version of F1 for any reason such as spurious noise occurring during a tape drop-out. The default counter is usually considered to be exceeded if it indicates that the VCR has been in "PLAY" for approximately 8 seconds (480 synch pulses).

Preferred Cue Mark VTR or VCR

The flowchart of FIGS. 6a and 6b describes a program used to operate a VCR which has the capability of inserting cue marks (such as on an auxiliary audio track extending lengthwise on the tape adjacent the video slant tracks) at precisely defined points. These cue marks can thereafter be located when reviewing (backscanning) or by rewinding.

Again using the operating sequence referred to in FIG. 4, the program in FIGS. 6a and 6b will respond to each vertical sync by looping from (b) to (c), (d), (e), (f), and back to (b) until the first valid fade transition is encountered.

At the first fade transition F1 the sequence will be (b), (c), (d), (g), (h), (f) and back to (b). If fade F1 is longer than 2 fields but less than one second, the sequence changes to (b), (c), (d), (g), (i), (j), (k), (f) and back to (b). This latter part of F1 is treated as though it were part of the first commercial C1 of a series.

Assuming F1 is less than 1 second the television signal, now into commercial C1, will cause the sequence to change to (b), (c), (d), (e), (j), (k), (f) and back to (b). Both of the above sequences increment a clock which monitors how much time has elapsed after F1.

At the second fade transition F1, a single sequence of (b), (c), (d), (g), (i), (l), (m), (n), (p) and (b) will result and the VCR will have scanned back to the location of the earlier recorded F1 on the tape. C2 begins to overwrite C1 as the sequence (b), (c), (d), (e), (j), (k), (f) and (b) repeats many times until arriving at F3 whereupon the single sequence (b), (c), (d), (g), (i), (l), (m), (n), (p) and (b) again results. At this point the resumption of noncommercial program P2 begins to overwrite C2.

The sequence changes back to (b), (c), (d), (e), (j), (k), (f), and (b) again and continues for 2 minutes. Then at (k) the elapse of 2 minutes from the last deleted fade transition is sensed and a single sequence of (b), (c), (d), (e), (j), (k), (q), (f) and (b) clears the Comm. Imm. flag. Then the sequence becomes (b), (c), (d), (e), (f) and (b) as it was during P1 in response to each succeeding vertical sync.

Offset Cue Mark VTR or VCR

Figure 7A:
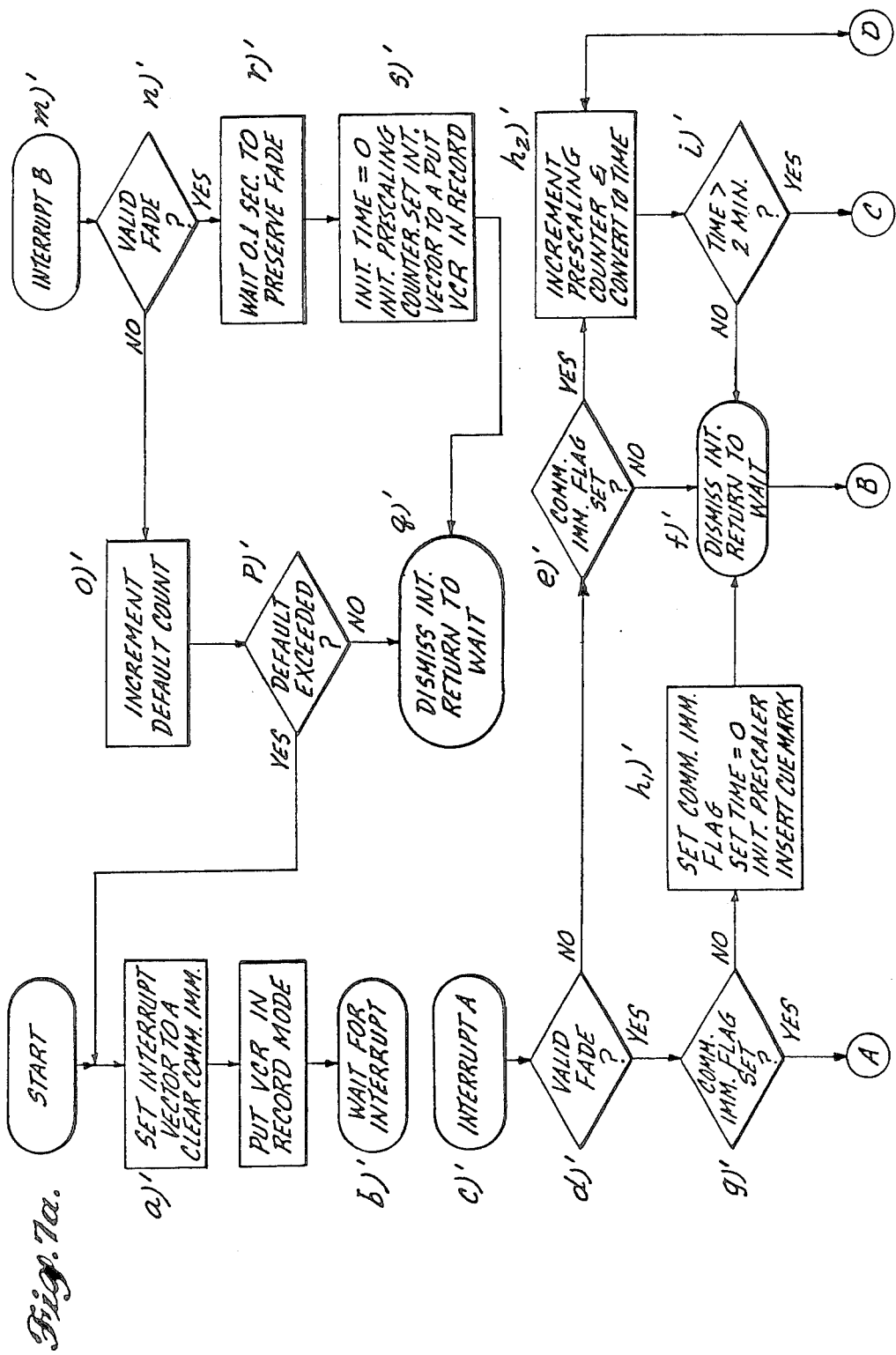

While the foregoing, ideal cue marking VCR is preferred for use with the invention, known commercial units that have cue marking capability do not locate the cue mark precisely at the desired cue (stopping) point, thus causing an offset between the desired tape location at which F1 is recorded and the recorded cue mark. For these nonideal cue marking VCRs, control 18 will be programmed to operate as shown in FIGS. 7a and 7b. Such a VCR produces a cue mark of say 5 seconds duration. If during rewind the VCR is designed to stop immediately after encountering the cue mark, then rewinding back to the mark would cause a positioning error of approximately 5 seconds as the VCR would be positioned at the trailing (with reference to the forward direction of tape movement) edge of the mark. An example of such a VCR is Model VT8500A, made by Hitachi Corporation, Lyndurst, N.J.

The flowchart operation in FIGS. 7a and 7b is similar to the of FIGS. 5a and 5b diagram except for the addition of the processing steps (x), (y), and (z). At fade F1 (FIG. 4), the program in FIGS. 7a and 7b reaches (h1)' exactly as it would reach (h1) in FIGS. 5a and 5b where in addition to those functions a cue mark is inserted on to the tape at operation (h1)'.

At fade F2 in FIG. 4, the program of FIGS. 7a and 7b follows to (x). Here a decision is made, based on preknowledge of the length of the cue mark (unique to a particular VCR brand), as to whether fade F2 occurred ahead of the trailing edge (reference to forward tape direction) of the cue mark or not. If not, the program goes to (y) where the VCR is rewound to the trailing edge of the cue mark. The value of TIME (see (h2)') is made equal to the length of the cue mark.

If F2 did occur before the end of the cue mark, the path will be direct from (x) to (z) with no rewind operation required. TIME (see h2)' in FIG. 7a will be correspondingly less.

In either case, at (z) the value of TIME will be used with prescaling to produce a BACKSCAN (or REVIEW) of the tape as indicated. The program will then operate in the same manner as FIGS. 5a and 5b.

Variable (Nonfixed) Backscan Rate VTR or VCR

The operation shown in FIGS. 8a and 8b is used for a VCR whose BACKSCAN (or REVIEW) speed is not constant. Typically the speed starts at zero and slowly accelerates to some limiting value. An example is Model HS300U made by Mitsubishi Electric Corporaiton, Compton, Calif.

Again, operation is similar to FIGS. 5a and 5b. The main difference is that the program has a set of predetermined characeristic curves empirically derived, which estimate how long to BACKSCAN (REVIEW) given the length of time of a commecial. This BACKSCAN subsystem is used instead of a prescaling counter. There is also a learning subsystem which inspects how far past F1 the particular VCR backspaces and selects an appropriate curve to attempt to keep the overshoot to an acceptable value of approximately 2 seconds. This 2 second overshoot time is arbitrary and can vary with each individual brand of VCR having a varying rate backscan.

Referring to FIGS. 8a and 8b the function of (a)" now includes presetting a pointer to the bottom of a family of curves. The function at (h)" keeps time with no prescaling. The function at (k)" now uses the curve to select the BACKSCAN or REVIEW time. Finally, functions (u)" and (v)" are added to decide whether or not to move the pointer to a more appropriate curve.

While only certain embodiments have been disclosed, it will be apparent to persons skilled in the art that numerous changes and modificatios can be made thereto including the use of equivalent devices, means and method steps without departing from the spirit of the invention.

The embodiments of the invention in which an exclusive property or privilege is claimed are defined as follows:

1. An apparatus for controlling a video recorder to cause the deletion of interruptions in a program content of a television signal recorded onto a transported recording medium, wherein such interruptions are accompanied by a series of time spaced detectable transitions characterized by predetermined amplitude conditions of video and audio components of the television signal existing for a predetermined minimum time and including a first transition and at least a second transition, and wherein such recorder is responsive to control signals to selectively assume a record mode in which the recording medium is transported in a forward direction and a reverse mode in which the recording medium is transported in the reverse direction, said apparatus comprising:

detection circuit means for receiving a television signal and detecting each of a series of said transitions;

control means responsive to said detection circuit means and adapted to transmit control signals to the recorder, said control means comprising first, second, third and fourth means;

said first means of said control means being responsive to said detection circuit means detecting a first transition of a series for memorizing the location at which such first transition is recorded onto the medium;

the second means of said control means being responsive to said detection circuit means detecting a second and each succeeding transition in a series when the recorder is in its record mode for producing in response to said second and each succeeding transition of the series a reverse command signal to cause the recorder to reverse the transported recording medium;

the third means of said control means cooperating with the first and second means for causing the recorder to transport the recording means proximate to the location where the first transition of the series is recorded; and the fourth means of said control means being responsive to the operation of the third means for producing a record command signal when the recorder has transported the recording medium proximate to the location where the first transition of the series is recorded.

2. The apparatus of claim 1 wherein the interruptions in the program content of the television signal occur singly or consecutively in a group of two or more, and wherein the time between the end of a single interruption or the end of a group of consecutive interruptions and the beginning of a subsequent interruption after intervening program content is normally greater than a first predetermined time duration, and wherein said control means further comprises a fifth means for reseting said first means of said control means after a measured time interval from the last transition of a series of transitions detected by said detection circuit means, said measured time interval being greater than the anticipated duration of any one of said interruptions and less than said first predetermined time duration such that said control means is reset for responding to a subsequent series of transitions associated with said subsequent interruption.

3. The apparatus of claim 1 wherein the recorder has a play mode responsive to a play command signal in which the recording medium is advanced in the forward direction to play back the recorded television signal, and wherein said third means of said control means comprises means for first causing said second means to transport the recording medium in a reverse direction to a position that overshoots the location of the recorded first transition, and means for then producing a play command signal for causing the recorder to reproduce the previously recorded television signal up to the location of the recorded first transition, and means for sensing the playback of the recorded first transition in the television signal, and wherein said fourth means of said control means is responsive to said means for sensing the playback of said first transition to produce said record command signal.

4. The apparatus of claim 1 wherein said first means of said control means comprises timer means for timing the interval between the detection of the first and second transitions by said detection circuit means, said timer means cooperating with said third means of said control means for causing the transported medium to be reversed to the location of the first recorded transition.

5. The apparatus of claim 1, wherein said first means of said control means comprises counter means responsive to sync pulses of the television signal for memorizing the location of the first transition by registering the number of said sync pulses that occur between the detection of the first transition by said detection circuit means and the detection of the second transition by said detection circuit means.

6. The apparatus of claim 5 wherein said sync pulses counted by said counter means comprise vertical synchronizing signals of the television signal.

7. The apparatus of claim 1 wherein the recorder is of the type that has means for recording a cue mark on the recording medium in response to a cue marking command signal, and wherein said first means of said control means comprises means for producing a cue marking command signal in response to the detection by said detection circuit means of said first transition of a series, and wherein third means of said control means comprises means cooperating with the recorder for locating a cue mark on the recording medium during the reverse transport of said recording medium.

8. The apparatus of claim 1 wherein the recorder is of the type that has measurement means for measuring the transport movement of the recording medium, and wherein said first means of said control means includes means for memorizing a status of said measurement means of the recorder in response to the detection of the first transition of a series by said detection circuit means, and wherein said third means of said control means comprises means for returning the recording medium to a location thereof corresponding to the status of said measurement means when said detection cirucit means detected the first transition.

9. The apparatus of claim 8, wherein said video recorder is a tape recorder and said measurement means is a means for measuring the lengthwise movement of the recording tape as it is transported by said recorder.

10. An apparatus for controlling a video recorder to cause the deletion of interruptions in program content of a television signal recorded onto a transported recording medium, wherein such interruptions are accompanied by a series of time spaced detectable transitions characterized by a predetermined amplitude condition of the television signal that exists for a predetermined time, and which includes a first transition and at least a second transition, and wherein such recorder is responsive to control signals to selectively assume a record mode in which the recording medium is transported in a forward direction, a reverse mode in which the recording medium is transported in the reverse direction and a play mode in which the recording medium is transported in a forward direction, said apparatus comprising:

detection circuit means for receiving a television signal and detecting each of a series of said transitions;

control means responsive to said detection circuit means and adapted to transmit control signals to the recorder, said control means comprising:

a position memory means being responsive to said detection circuit means detecting a first transition of a series for memorizing the location at which such first transition is recorded onto the medium;

reversing means being responsive to said detection circuit means detecting a second and each succeeding transition in a series when the recorder is in its record mode for producing in response to said second and each succeeding transition of the series a reverse command signal to cause the recorder to reverse the transported recording medium;

reverse overshoot means cooperating with said position memory and reversing means for causing the recorder to transport the recording medium in the reverse direction to an overshoot position that precedes the medium location where the first transition of the series is recorded;

playback command means for causing the recorder to assume the play mode following operation of the reverse overshoot means; and record mode command means responsive to playback of the recorded first transition for producing a record command signal when the recorder has transported the recording medium in the forward direction to the location where the first transition of the series has been previously recorded.

* * * * *